US012645013B2

(12) United States Patent
Wan et al.

(10) Patent No.: US 12,645,013 B2
(45) Date of Patent: Jun. 2, 2026

(54) POLARIZERS AND LIQUID CRYSTAL DISPLAY DEVICES

(71) Applicant: TCL CHINA STAR OPTOELECTRONICS TECHNOLOGY CO., LTD., Shenzhen (CN)

(72) Inventors: Wen Wan, Shenzhen (CN); Ji Li, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 305 days.

(21) Appl. No.: 18/553,551

(22) PCT Filed: Jun. 25, 2023

(86) PCT No.: PCT/CN2023/102134
§ 371 (c)(1),
(2) Date: Sep. 30, 2023

(87) PCT Pub. No.: WO2024/212352
PCT Pub. Date: Oct. 17, 2024

(65) Prior Publication Data
US 2025/0076542 A1      Mar. 6, 2025

(30) Foreign Application Priority Data
Apr. 13, 2023      (CN) .......................... 202310394231.4

(51) Int. Cl.
*G02B 1/14*          (2015.01)
*G02B 5/02*          (2006.01)
*G02B 5/30*          (2006.01)
*G02F 1/1335*        (2006.01)

(52) U.S. Cl.
CPC ............. *G02B 1/14* (2015.01); *G02B 5/0242* (2013.01); *G02B 5/3008* (2013.01); *G02F 1/133528* (2013.01)

(58) Field of Classification Search
None
See application file for complete search history.

(56) References Cited

U.S. PATENT DOCUMENTS

2007/0030417 A1      2/2007   Kubo et al.
2012/0329974 A1      12/2012   Inada et al.
2021/0215971 A1      7/2021   Liao et al.
(Continued)

FOREIGN PATENT DOCUMENTS

CN          105400251 A       3/2016
CN          109799562 A       5/2019
(Continued)

OTHER PUBLICATIONS

Chinese Office Action issued in corresponding Chinese Patent Application No. 202310394231.4 dated May 22, 2023, pp. 1-8.
(Continued)

*Primary Examiner* — Phu Vu
(74) *Attorney, Agent, or Firm* — PV IP PC; Christopher S. Ruprecht; Wei Te Chung

(57)          ABSTRACT

A polarizer and a liquid crystal display device. The polarizer includes a hard coating including whiskers.

18 Claims, 6 Drawing Sheets

(56)    References Cited

U.S. PATENT DOCUMENTS

| | | |
|---|---|---|
| 2023/0041225 A1 | 2/2023 | Lee et al. |
| 2023/0118043 A1* | 4/2023 | Hong ........................ G02B 1/14 |
| | | 359/483.01 |

FOREIGN PATENT DOCUMENTS

| | | | |
|---|---|---|---|
| CN | 114384623 A | 4/2022 | |
| CN | 114415274 A | 4/2022 | |
| CN | 114509842 A | 5/2022 | |
| CN | 115685429 A | 2/2023 | |
| CN | 116106999 A | 5/2023 | |
| CN | 116107012 A | 5/2023 | |
| CN | 116125582 A | 5/2023 | |
| EP | 2774892 A1 | 9/2014 | |
| JP | H11194204 A | 7/1999 | |
| JP | 2007249181 A | 9/2007 | |
| TW | 200604561 A | 2/2006 | |
| TW | 201930514 A | 8/2019 | |

OTHER PUBLICATIONS

International Search Report in International application No. PCT/CN2023/102134, mailed on Sep. 25, 2023.
Written Opinion of the International Search Authority in International application No. PCT/CN2023/102134, mailed on Sep. 25, 2023.

* cited by examiner

<u>3</u>

1

LCD

100

POLARIZERS AND LIQUID CRYSTAL DISPLAY DEVICES

CROSS REFERENCE TO RELATED APPLICATIONS

This application is a continuation of International Application No. PCT/CN2023/102134, filed on Jun. 25, 2023, which claims priority of Chinese patent application No. 2023103942314 filed on Apr. 13, 2023. The disclosures of the above applications are incorporated herein by reference in their entireties.

TECHNICAL FIELD

The present disclosure relates to display technologies, in particular to polarizers and liquid crystal display devices.

BACKGROUND

Nowadays, liquid crystal display (LCD) has a high market share due to advantages such as small size, light weight, easy formation of large-size panels, high resolution, etc., and has a better performance in both home and public display devices. However, due to its inherent display by liquid crystal deflection, the effect of display in different directions depends on the spatial arrangement of the liquid crystals, which leads to a serious problem of color distortion at a side view angle. In order to solve this problem, a traditional technical measure is to apply a light diffusion film and a light intensity compensation film to the liquid crystal display, so that the light passing through the liquid crystal screen is uniformly diffused and the light intensity at certain angles is compensated. This method is simple to operate and has a high yield rate, but the improvement effect is relatively limited.

A known improved method improves the side display effect by adding whiskers to the pressure sensitive adhesive (PSA) layer. However, due to the addition of whiskers, the brightness and contrast is affected by some extent.

SUMMARY

One or more embodiments of the present application provide a polarizer and a liquid crystal display device capable of enhancing brightness and contrast.

One or more embodiments of the present application provide a polarizer comprising a hard coating comprising whiskers.

Optionally, the polarizer further includes a polarizing film and a substrate, the substrate is provided between the polarizing film and the hard coating, and the polarizing film, the substrate and the hard coating are in contact two by two.

Optionally, the hard coating has a glass transition temperature of 70 degrees Celsius to 120 degrees Celsius.

Optionally, the hard coating has a pencil hardness greater than or equal to 2H.

Optionally, an acute angle of greater than 0° and less than or equal to 40° is formed between a long-axis direction of the whiskers and a bottom surface of the hard coating.

Optionally, the whiskers include first particles have a same diameter in a lengthwise direction of the first particles, and second particles comprise a first end portion and a second end portion in a lengthwise direction thereof, a diameter of the first end portion decreasing along a direction away from the second end portion.

Optionally, a diameter of the second particles decreases along a direction of the second end portion toward the first end portion; or a diameter of the second end portion decreases along a direction away from the first end portion.

Optionally, a diameter of the second particles decreases along a direction of the second end portion toward the first end portion; and a diameter of the second end portion decreases along a direction away from the first end portion.

Optionally, the second particles further include an intermediate portion, the first end portion, the intermediate portion, and the second end portion are sequentially connected;

the intermediate portion has a same diameter in a lengthwise direction of the second particles, and a diameter of the second end portion decreases or the second end portion has a same diameter along a direction away from the first end portion.

Optionally, a sum of a mass of the first particles and the second particles is 10% of a mass of the hard coating;

the second particles comprise first class particles and second class particles, each the first class particles and each the second class particles comprising a first end portion and a second end portion in the lengthwise direction thereof;

a diameter of the first class particles decreases along a direction of the second end portion of the first class particles toward the first end portion;

a diameter of the second end portion of the second class particles decreases in a direction away from the first end portion of the second class particles; and a ratio of a mass of all the first particles, a mass of all the first class particles, and a mass of all the second class particles is (1~10):(40~70):(20~60).

One or more embodiments of the present application also provide a liquid crystal display device comprising a polarizer described above.

BENEFICIAL EFFECT

The present application compensates for the lack of brightness in side view by adding whiskers to a hard coating. Compared to the pressure sensitive adhesive of the prior art, the hard coating only requires a substrate to be provided on one side, thereby allowing a layer of substrate to be omitted and simplifying the structure of the polarizer, and at the same time, its brightness and contrast are improved due to the omission of a layer of substrate.

BRIEF DESCRIPTION OF THE DRAWINGS

In order to more clearly illustrate the technical solutions in the present application, the accompanying drawings to be used in the description of the embodiments will be briefly introduced in the following, and it is obvious that the accompanying drawings in the following description are only some of the embodiments of the present application, and other accompanying drawings may be obtained by those skilled in the art according to these drawings, without paying creative labor.

DETAILED DESCRIPTION

Some embodiments of the present application will be described in detail below in conjunction with the accompanying drawings. Obviously, the described embodiments are only a part of embodiments of the present application, but not all of the embodiments. Based on the embodiments in the present application, all other embodiments obtained by a person skilled in the art without making creative labor fall within the scope of protection of the present application.

In this application, unless otherwise expressly provided and limited, a first feature "over" a second feature or a first feature "below" a second feature may include the first and the second feature being directly connected, or the first and the second feature not being directly connected, but being in contact with each other through another feature between them. Furthermore, the first feature being "above", "over", and "on" the second feature includes the first feature being directly above and diagonally above the second feature, or simply indicating that the first feature is horizontally higher than the second feature. Furthermore, the terms "first" and "second" are used for descriptive purposes only and are not to be understood as indicating or implying relative importance or implicitly specifying the number of technical features indicated. Thus, a feature defined with "first" or "second" may include one or more features, either explicitly or implicitly.

Figure 1:
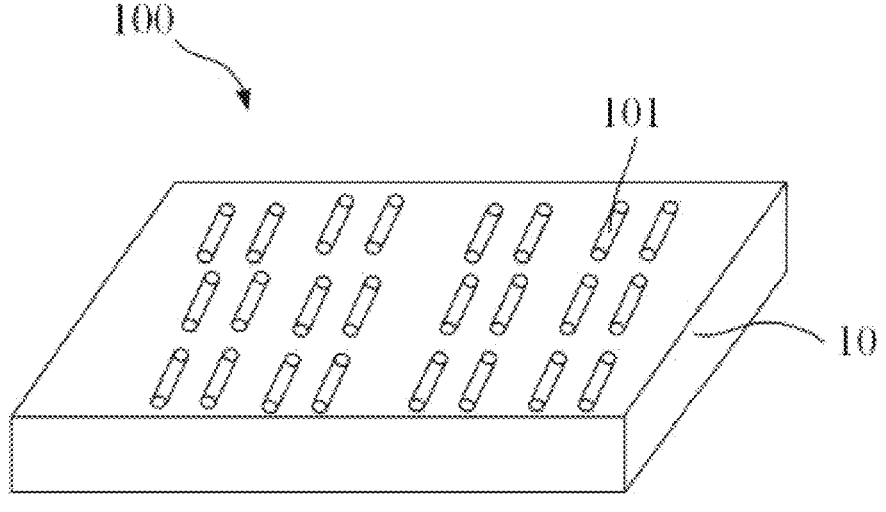
FIG. 1 is a schematic structural diagram of a polarizer according to one or more embodiments of the present application.

Referring to FIG. 1, one or more embodiments of the present application provide a polarizer 100 that can be used in a liquid crystal display (LCD) device. The liquid crystal display device has a liquid crystal case with a liquid crystal layer sealed between an array substrate and a color filter substrate. When an electric field is applied to the electrodes of the array substrate and the color filter substrate, the arrangement of liquid crystal molecules of the liquid crystal layer sealed therein changes, thereby displaying an image. The polarizer is disposed on the outside of the array substrate and the color filter substrate. The polarizer enables the polarization to be controlled by selectively transmitting light in a particular direction from the incident light from the backlight unit and the light transmitting through the liquid crystal layer.

Figure 2:
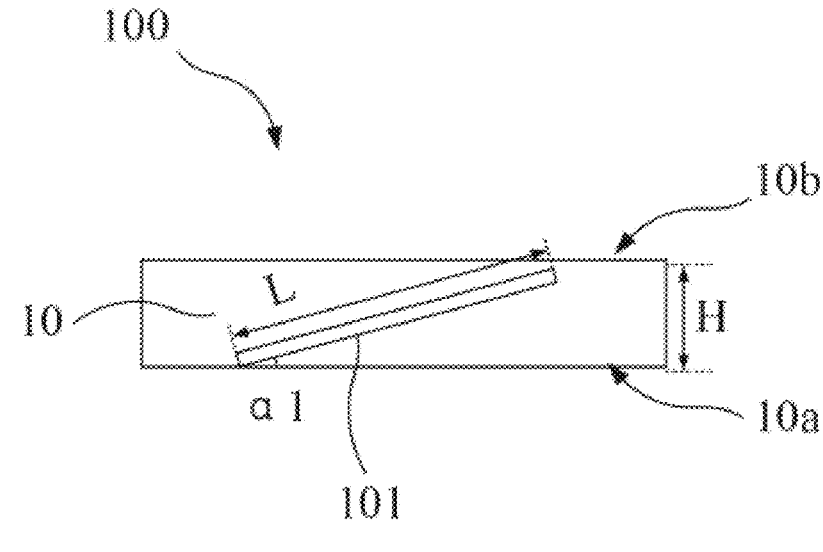
FIG. 2 is a schematic diagram of an arrangement of whiskers in a hard coating according to one or more embodiments of the present application.

The polarizer 100 includes a hard coating 10 including whiskers 101. Referring to FIG. 2, the thickness of the hard coating 10 is H, the length of the whiskers 101 is L, and an acute angle $\alpha1$ formed between a long-axis direction of the whiskers 101 and a bottom surface 10a is in the range of $-\arcsin (H/L)$ to $\arcsin (H/L)$. The inventors have found after research that the acute angle $\alpha1$ has an effect on the optical performance of the polarizer.

Specifically, when the whiskers 101 are added to the polarizer 100, if the acute angle between the long-axis direction of the whiskers 101 and the bottom surface 10a is greater than 0° and less than or equal to 40°, it is favorable to improve the luminance viewing angle and the chromaticity viewing angle. Specifically, since the length of the whiskers is fixed, the amount of light scattered by the whiskers is fixed. The amount of light scattered by the whiskers can be divided into a component of the whiskers in the direction parallel to the bottom surface of the hard coating (referred to as a left-right component) and a component of the whiskers in the direction perpendicular to the bottom surface of the hard coating (referred to as a top-bottom component). If the left-right component is large, the top-bottom component is small. When the angle between the whiskers and the hard coating is smaller and the left-right component is larger (i.e., the projection of the whiskers on the hard coating is larger), the left-right scattering is stronger and the left-right viewing angle performance is better, and vice versa.

Further, experimental results show that when the acute angle $\alpha1$ between the long-axis direction of the whiskers 101 and the bottom surface 10a is less than or equal to 20°, the luminance viewing angle and the chromaticity viewing angle are further improved.

It should be noted that the polarizer 100 may include a plurality of film layers (not shown in FIG. 1) stacked sequentially. The thickness of the hard coating 10 is the thickness in the direction of the plurality of film layers stacked. The hard coating 10 includes a bottom surface 10a and a top surface 10b opposite to each other in the direction of the stack of film layers. Optionally, the bottom surface 10a is located on the light-entry side of the top surface 10b or, alternatively, the bottom surface 10a is the one that is formed firstly when the hard coating is formed.

The whiskers 101 may be column or cone, for example, a cylinder, an elliptical cylinder, a triangular prism, a quadrangular prism, a polygonal prism, a triangular cone, a quadrangular cone, or a polygonal cone. The long-axis direction of the whiskers indicates the height direction of the column or cone, and the length L indicates the length in the height direction of the column or cone, also referred to as the length in the long-axis direction.

Optionally, the hard coating 10 includes a first hard coating and a second hard coating, and the whiskers 101 are included only in the first hard coating, while the second hard coating does not include the whiskers 101. The hard coating 10 is manufactured by firstly dispersing the whiskers 101 in a resin composition, forming the first hard coating by coating to fix the angle of the whiskers 101 in the first hard coating, and then forming the second hard coating on the first hard coating by coating, and forming the hard coating 10 with a predetermined thickness by the first hard coating together with the second hard coating. By controlling the thickness of the first hard coating and the length L of the whiskers 101, it is possible to control the acute angle $\alpha 1$ of the whiskers 101 in the first hard coating, and thus the acute angle $\alpha 1$ of the whiskers 101 in the hard coating 10 can be controlled. For example, if the whiskers 101 having a length of 30 $\mu$m are selected to be mixed with the resin composition, a first hard coating of 5 $\mu$m is coated and formed on the intermediate substrate, and then a second hard coating of 20 $\mu$m is formed on the first hard coating, a hard coating 10 with an acute angle $\alpha 1$ between the long-axis direction of the whiskers 101 and the bottom surface 10$a$ of arcsin (5/30) =9.59° and a thickness of 25 $\mu$m can be obtained, and so on. It could be understood that the acute angle $\alpha 1$ can be slightly inaccurate within the range allowed by the process.

Optionally, the material of the whiskers 101 is selected from at least one of the following compounds: metal oxides, such as titanium oxide (e.g., $TiO_2$), zirconium oxide (e.g., $ZrO_2$) and zinc oxide (e.g., ZnO); metal compounds, such as calcium carbonate ($CaCO_3$); boehmite; aluminum borate (e.g., $AlBO_3$); calcium silicate (e.g., $CaSiO_3$, wollastonite); magnesium sulfate ($MgSO_4$); magnesium sulfate hydrate (e.g., $MgSO_4 \cdot 7H_2O$) and potassium titanate (e.g., $K_2Ti_8O_{17}$) glass, and synthetic resins. Optionally, the material of the whiskers 101 is selected from at least one of the following compounds: titanium oxide, zirconium oxide, zinc oxide, calcium carbonate, boehmite, aluminum borate, calcium silicate, magnesium sulfate, magnesium sulfate hydrate, and potassium titanate.

Optionally, the length L of the whiskers 101 is from 3 $\mu$m to 30 $\mu$m and the diameter of the whiskers 101 is from 0.003 $\mu$m to 13 $\mu$m. It should be noted that the lengths of the whiskers 101 are not identical even for the same batch, and it is sufficient in the present application as long as the dimensions of the whiskers 101 are within the above ranges.

Specifically, the length of the whiskers 101 may be 3 $\mu$m, 4 $\mu$m, 5 $\mu$m, 6 $\mu$m, 7 $\mu$m, 8 $\mu$m, 9 $\mu$m, 10 $\mu$m, 11 $\mu$m, 12 $\mu$m, 13 $\mu$m, 14 $\mu$m, 15 $\mu$m, 16 $\mu$m, 17 $\mu$m, 18 $\mu$m, 19 $\mu$m, 20 $\mu$m, 21 $\mu$m, 22 $\mu$m, 23 $\mu$m, 24 $\mu$m, 25 $\mu$m, 26 $\mu$m, 27 $\mu$m, 28 $\mu$m, 29 $\mu$m, and 30 $\mu$m.

Optionally, the diameter of the whiskers 101 may be 0.003 $\mu$m, 0.005 $\mu$m, 0.008 $\mu$m, 0.01 $\mu$m, 0.3 $\mu$m, 0.4 $\mu$m, 0.5 $\mu$m, 0.6 $\mu$m, 0.7 $\mu$m, 0.8 $\mu$m, 0.9 $\mu$m, 1.0 $\mu$m, 1.1 $\mu$m, 1.2 $\mu$m, 1.3 $\mu$m, 1.4 $\mu$m, 1.5 $\mu$m, 1.6 $\mu$m, 1.7 $\mu$m, 1.8 $\mu$m, 1.9 $\mu$m, 1.10 $\mu$m, 1.11 $\mu$m, 1.12 $\mu$m, 1.13 $\mu$m, 1.14 $\mu$m, 1.15 $\mu$m, 1.16 $\mu$m, 1.17 $\mu$m, 1.18 $\mu$m, 1.19 $\mu$m, 1. $\mu$m, 1.21 $\mu$m, 1.22 $\mu$m, 1.23 $\mu$m, 1.24 $\mu$m, 1.25 $\mu$m, 1.26 $\mu$m, 1.27 $\mu$m, 1.28 $\mu$m, 1.29 $\mu$m, 1.30 $\mu$m, 2 $\mu$m, 3 $\mu$m, 4 $\mu$m, 5 $\mu$m, 6 $\mu$m, 7 $\mu$m, 8 $\mu$m, 9 $\mu$m, 10 $\mu$m, 11 $\mu$m, 12 $\mu$m, 13 $\mu$m. While ensuring that Mie scattering occurs, it is possible to reduce the loss of light due to the whiskers 101 being too large in area.

If the size of the whiskers 101 is too small, the scattering effect is not achieved. If the size of the whiskers 101 is too large, the whiskers 101 will protrude from the hard coating 10 due to the limitation of the film thickness of the hard coating 10 (more than 10 $\mu$m to tens of $\mu$m), which affects the flatness of the film layers. In addition, a length of the whiskers 101 that is too long will lead to excessive aggregation of the whiskers 101, affecting the appearance.

Figure 3:
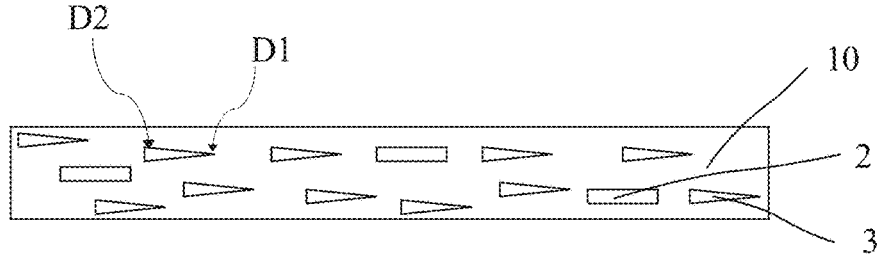
FIG. 3 is a schematic structural diagram of a first structure of a hard coating according to one or more embodiments of the present application.

Referring to FIG. 3, the whiskers 101 may include first particles 2 and second particles 3. The first particles 2 have the same diameter in the length direction of the first particles 2. The second particles 3 include a first end portion D1 and a second end portion D2 in its length direction, and the diameter of the first end portion D1 decreases along the direction away from the second end portion D2.

Figure 4:
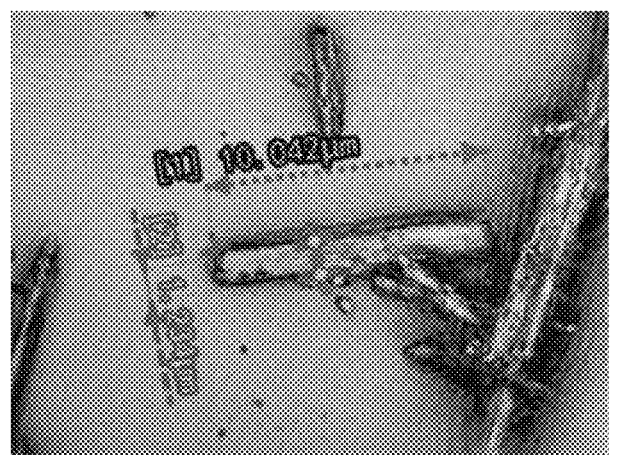
FIG. 4 is a diagram characterizing first particles of a hard coating according to one or more embodiments of the present application.

The present application enables the polarizer 100 to have a scattering effect, as well as makes the display panel to which the polarizer 100 is affixed have a better contrast, by providing the first particles 2 and the second particles 3 in the hard coating 10 of the polarizer 100. Referring to FIG. 4, the first particles 2 have the same diameter in the length direction of the first particles 2. The second particles 3 include a first end portion D1 and a second end portion D2 in its length direction, and the diameter of the first end portion D1 decreases along the direction away from the second end portion D2. Both the first particles 2 and the second particles 3 can cause the polarizer 100 to have a scattering effect, which can improve the chromaticity angle of view of the affixed polarizer 100. Moreover, mixing the second particles 3 with the first particles 2 can reduce the effect of the contrast of the display panel to which the polarizer 100 is affixed, so that the display panel to which the polarizer 100 is affixed has a better contrast.

It should be noted that the contrast of the present application refers to the ratio of the brightness of the display panel in the white state to the brightness of the display panel in the dark state. If only the first particles 2 with the same diameter at each place are provided in the polarizer 100, i.e., only cylindrical particles are provided, the cylindrical particles scatter light well. In the dark state, the external ambient light is scattered by the first particles 2, and the brightness of the display panel is larger. In the white state, the light emitted by a light-emitting unit is scattered by the first particles 2, and the brightness of the display panel is uniformly diffused, resulting in a smaller brightness, and the combined effect makes the contrast of the display panel decrease significantly. The diameter of the first end portion D1 of the second particles 3 decreases along the direction away from the second end portion D2, and its scattering effect is weaker than that of the first particles 2. By providing both the first particles 2 and the second particles 3 in the polarizer 100, in the dark state, the external ambient light is scattered by the mixed particles, and the brightness of the display panel is smaller. In the white state, the light emitted from the light-emitting unit is scattered by the mixed particles, and the brightness of the display panel is larger, and the combined effect makes the polarizer 100 have a scattering effect while the contrast of the display panel to which the polarizer 100 is attached is less affected, thus the contrast is better.

In addition, the polarizer 100 is provided with only the first particles 2 having the same diameter at each place, i.e., only cylindrical particles are provided, and the transmittance rate of the polarizer 100 is also slightly lower than the transmittance rate when the first particles 2 and the second particles 3 are mixed.

Optionally, the thickness of the hard coating 10 is greater than 3 $\mu$m and less than 50 $\mu$m. Specifically, the thickness of the hard coating 10 may be 4 $\mu$m, 5 $\mu$m, 6 $\mu$m, 10 $\mu$m, 12 $\mu$m, 15 $\mu$m, 17 $\mu$m, 18 $\mu$m, 20 $\mu$m, 24 $\mu$m, 25 $\mu$m, 26 $\mu$m, 30 $\mu$m, 33 $\mu$m, 35 $\mu$m, 38 $\mu$m, 40 $\mu$m, 45 $\mu$m, or 48 $\mu$m.

Figure 5:
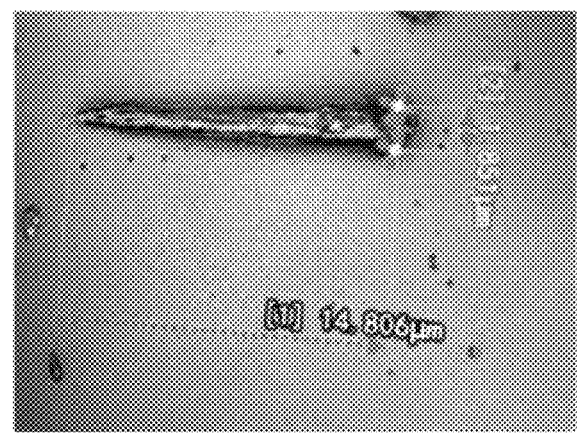
FIG. 5 is a diagram characterizing a first kind of second particles of a hard coating according to one or more embodiments of the present application.

Referring to FIG. 5, in one or more embodiments, the diameter of the second particles 3 decreases along the direction of the second end portion D2 toward the first end portion D1. That is, the second particles 3 are long cone-shaped.

It could be understood that the long cone-shaped second particles 3 have a weaker scattering effect than the first particles 2. Mixing the second particles 3 with the first particles 2 and setting them in the hard coating 10 can make the polarizer 100 have a scattering effect while the contrast of the display panel to which the polarizer 100 is attached is less affected, thus the contrast is better.

In one or more embodiments, the first particles 2 have a diameter of 0.008 μm to 12.4 μm. The second particles 3 have a maximum diameter of 12.4 μm and a minimum diameter of 0.008 μm.

Specifically, the diameter of the first particles 2 may be 0.008 μm, 0.01 μm, 0.05 μm, 0.1 μm, 0.5 μm, 1 μm, 1.4 μm, 2 μm, 2.5 μm, 3 μm, 3.6 μm, 5 μm, 5.7 μm, 6 μm, 8 μm, 9 μm, 10 μm, 11 μm, 12 μm, or 12.4 μm, etc. It is readily understood that the first particles 2 have the same diameter at each place in its length direction, meaning that the cylindrical particles have a diameter deviation within +20%. For example, the first particles 2 have a diameter of 1 to 3 μm, and there is a ±20% deviation of the diameter at each place, i.e., the diameter at each place ranges from 0.8 μm to 1.2 μm.

The second particles 3 may have a maximum diameter of 0.5 μm, 1 μm, 1.4 μm, 2 μm, 2.5 μm, 3 μm, 3.6 μm, 5 μm, 5.7 μm, 6 μm, 8 μm, 9 μm, 10 μm, 11 μm, 12 μm, or 12.4 μm, etc., and a minimum diameter of 0.008 μm, 0.01 μm, 0.05 μm, 0.1 μm, 0.5 μm, 1 μm, 1.4 μm, 2 μm, 2.5 μm, 3 μm, 3.6 μm, 5 μm, 5.7 μm, 6 μm, 8 μm, 9 μm or 10 μm, etc. It is readily understood that the maximum diameter of the second particles 3 is larger than the minimum diameter.

Optionally, the ratio of the length of the particles to the radius is greater than 1. Specifically, the ratio of the length of the particles to the radius may be 1.5, 2, 2.5, 3 or 5, etc.

By setting the diameter of the first particles 2 to be 0.008 μm to 12.4 μm, the maximum diameter of the second particles 3 to be 12.4 μm and the minimum diameter to be 0.008 μm, the present application can make the light passing through the hard coating 10 undergo Mie scattering, which leads to a better scattering effect, and is conducive to improving the chromaticity angle of view when the hard coating 10 is adhered to the display panel.

Specifically, the scattering includes Mie scattering and Rayleigh scattering. Mie scattering refers to the fact that when light shines on a particle whose diameter is comparable to, or larger than, the wavelength of light, the light is scattered mainly in the direction in which it originally traveled. In other words, the intensity of light scattered in the direction of travel is greater than the intensity of light scattered in the opposite direction of travel. The light is scattered uniformly along the direction of travel of light and in the opposite direction of travel of light when Rayleigh scattering occurs. That is, the light intensity scattered by Rayleigh scattering is less than the light intensity scattered by Mie scattering along the direction of travel of the light. Making the light passing through the hard coating 10 undergo Mie scattering enables a better scattering effect to be realized and reduces light loss.

Figure 6:
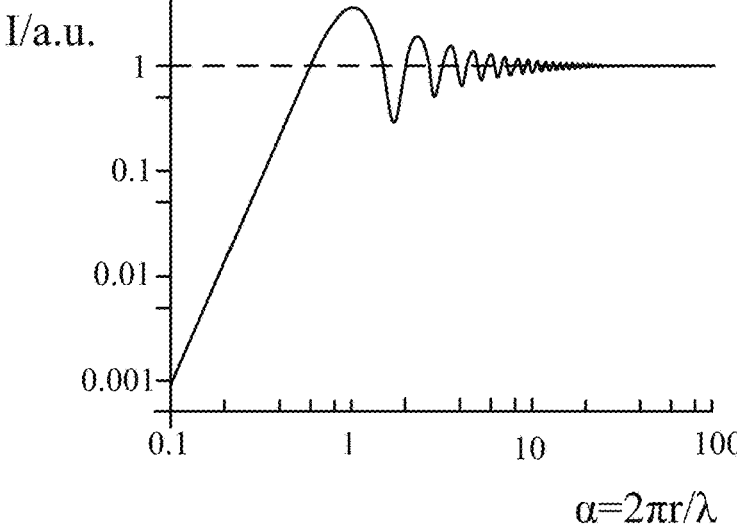
FIG. 6 is a schematic diagram of a magnitude of a light scattering intensity versus a scale number.

Mie scattering and Rayleigh scattering are usually distinguished by the size of the light and the particles, and different treatments are used according to the relative size of the particles to the wavelength of the light. The present application cites a dimensionless scale number as the discriminating criterion, and the dimensionless scale number is a function of the ratio of the radius of the particles to the wavelength of the radiation, with the formula: $\alpha=2\pi r/\lambda$, $\alpha$ refers to the dimensionless scale number, r refers to the radius of the particles, and $\lambda$ refers to the wavelength of the light. When the diameter of the particles is 0.008 μm to 12.4 μm, that is, the radius of the particles is 0.004 μm to 6.2 μm, the dimensionless scale number $\alpha$ is greater than or equal to 0.1, and $\alpha$ is less than 50. That is, when the dimensionless scale number $\alpha$ is within this range, Mie scattering occurs. When the dimensionless scale number $\alpha$ is much less than 0.1, Rayleigh scattering occurs. The intensity of scattering varies as a function of the ratio of the particle radius to the wavelength of the radiation, referring to FIG. 6, which is a schematic diagram of a magnitude of a light scattering intensity versus a scale number, the horizontal coordinate refers to the scale number $\alpha$, and the vertical coordinate refers to the intensity of scattering I. When the scale number $\alpha$ is greater than or equal to 0.1, the intensity of scattering I increases with the increase of the scale number $\alpha$ and eventually stabilizes near 1. In one or more embodiments, the ratio of the mass of all the first particles 2 to the mass of all the second particles 3 is (1~10):(90~99). Specifically, the ratio of the mass of all the first particles 2 to the mass of all the second particles 3 may be 1:99, 2:98, 3:97, 4:96, 5:95, 6:94, 7:93, 8:92, 9:91 or 10:90.

It could be understood that a mass ratio of the first particles 2 and the second particles 3 within this range enables the polarizer 100 to have a larger chromatic view angle and a larger contrast when attached to the display panel.

Figure 7:
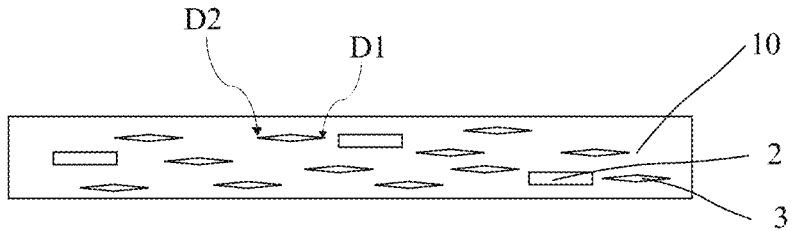
FIG. 7 is a schematic structural diagram of a second structure of a hard coating according to one or more embodiments of the present application.
Figure 8:
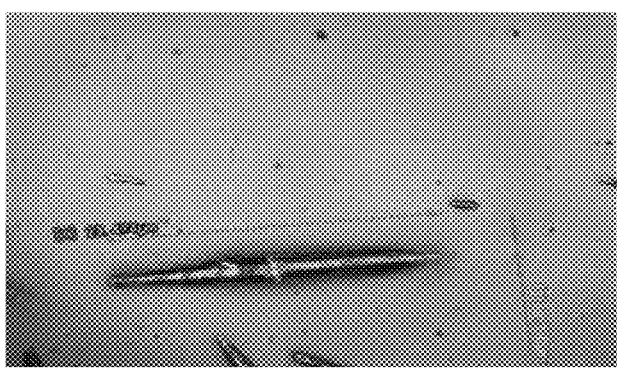
FIG. 8 is a diagram characterizing a second kind of second particles of a hard coating according to one or more embodiments of the present application.

Referring to FIG. 7 and FIG. 8, another embodiment of the present application provides a polarizer 100, and the embodiment differs from the embodiment of FIG. 1 in that the diameter of the second end portion decreases along the direction away from the first end portion. That is, the second particles 3 of this embodiment is biconical.

It could be understood that the biconical second particles 3 have a weaker scattering effect than the first particles 2. Mixing the second particles 3 with the first particles 2 and setting them in the hard coating 10 can make the polarizer 100 have a scattering effect while the contrast of the display panel to which the polarizer 100 is attached is less affected, thus the contrast is better.

Figure 9:
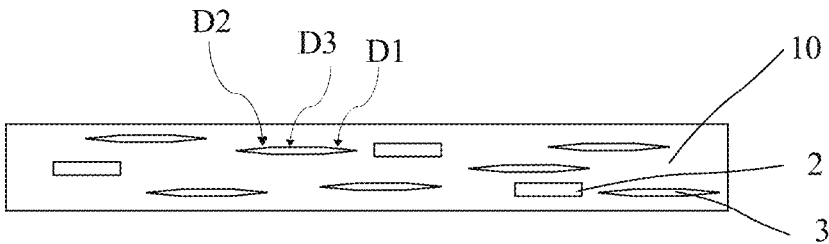
FIG. 9 is a schematic structural diagram of a third structure of a hard coating according to one or more embodiments of the present application.
Figure 10:
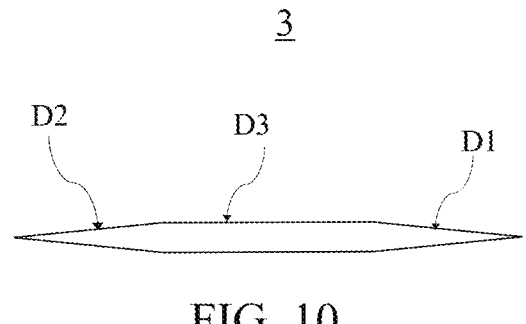
FIG. 10 is a diagram characterizing a third kind of second particles of a hard coating according to one or more embodiments of the present application.

Referring to FIG. 9 and FIG. 10, another embodiment of the present application provides a polarizer 100, and the embodiment differs from the embodiment of FIG. 3 and the embodiment of FIG. 7 in that the second particles 3 further include an intermediate portion D3, and the first end portion D1, the intermediate portion D3 and the second end portion D2 are connected in turn. In the length direction of the second particles 3, the intermediate portion D3 has the same diameter. The diameter of the second end portion D2 decreases along the direction away from the first end portion D1. That is, the second particles 3 of this embodiment include particles that are columnar in the middle and conical at both ends.

It could be understood that the second particles 3 with a columnar shape in the middle and conical shape at both ends have a weaker scattering effect than the first particles 2. Mixing the second particles 3 with the first particles 2 and setting them in the hard coating 10 can make the polarizer 100 have a scattering effect while the contrast of the display panel to which the polarizer 100 is attached is less affected, thus the contrast is better.

Figure 11:
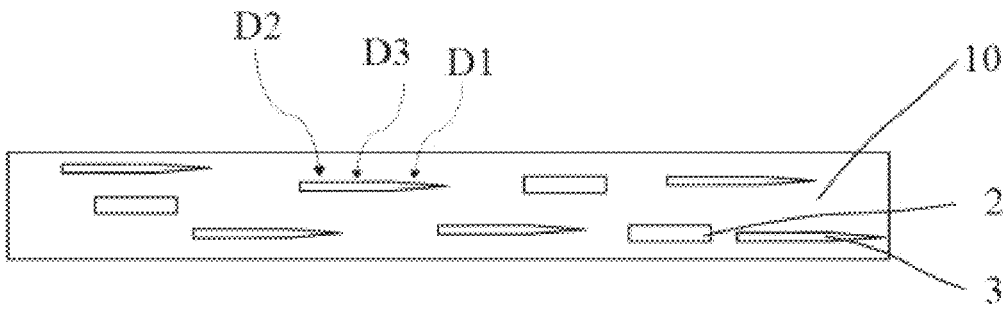
FIG. 11 is a schematic structural diagram of a fourth structure of a hard coating according to one or more embodiments of the present application.
Figure 12:
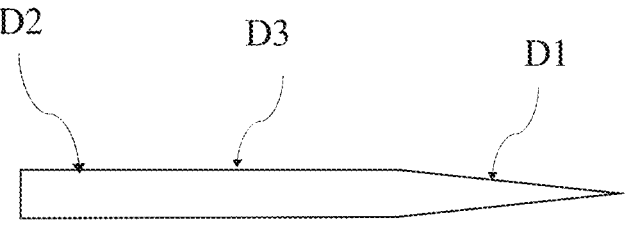
FIG. 12 is a diagram characterizing a fourth kind of second particles of a hard coating according to one or more embodiments of the present application.

Referring to FIG. 11 and FIG. 12, another embodiment of the present application provides a polarizer 100, and the embodiment differs from the embodiment of FIG. 3 in that the second particles 3 further include an intermediate portion D3, and the first end portion D1, the intermediate portion D3 and the second end portion D2 are connected in turn. In the length direction of the second particles 3, the intermediate portion D3 has the same diameter while the second end portion D2 has the same diameter. That is, the second particles 3 of this embodiment comprise particles in which the first end portion D1 is conical and the remaining portion is columnar.

It could be understood that the second particles 3 with the first end portion D1 being conical and the remaining portion being columnar have a weaker scattering effect than the first particles 2. Mixing the second particles 3 with the first particles 2 and setting them in the hard coating 10 can make the polarizer 100 have a scattering effect while the contrast of the display panel to which the polarizer 100 is attached is less affected, thus the contrast is better.

Figure 13:
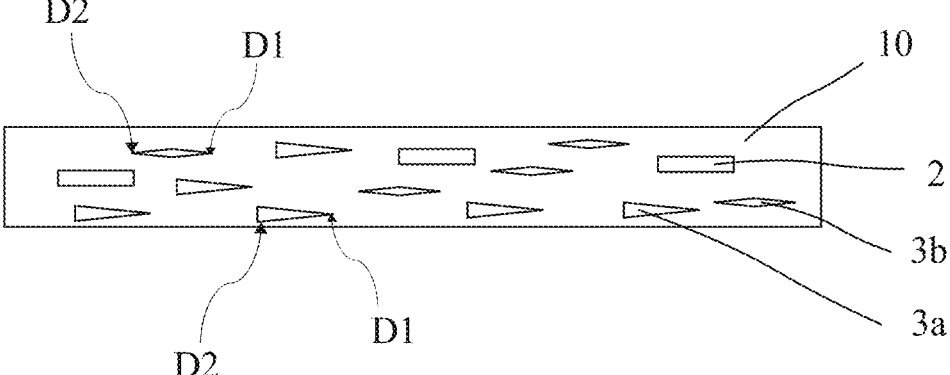
FIG. 13 is a schematic structural diagram of a fifth structure of a hard coating according to one or more embodiments of the present application.
Figure 14:
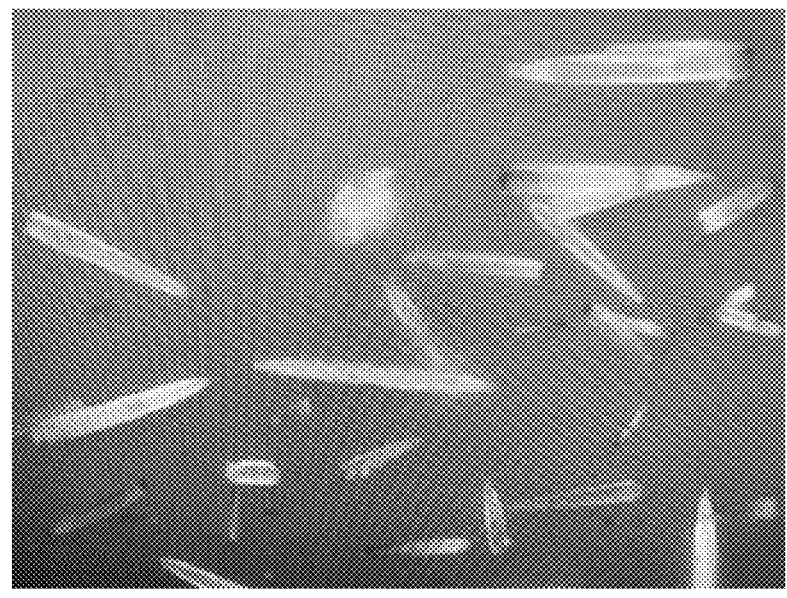
FIG. 14 is a diagram characterizing first particles, first sub-particles and second sub-particles of a hard coating according to one or more embodiments of the present application.

Referring to FIG. 13 and FIG. 14, another embodiment of the present application provides a polarizer 100, and the embodiment differs from the embodiment of FIG. 3 and the embodiment of FIG. 7 in that the second particles 3 include first class particles 3*a* and second class particles 3*b*. Each the first class particles 3*a* and each the second class particles 3*b* comprises a first end portion D1 and a second end portion D2 in the lengthwise direction thereof. The diameter of the first class particles 3*a* decreases along a direction of the second end portion D2 of the first class particles 3*a* toward the first end portion D1. The diameter of the first end portion D1 of the second class particles 3*b* decreases in a direction away from the second end portion D2 of the second class particles 3*b*. The diameter of the second end portion D2 of the second class particles 3*b* decreases in a direction away from the first end portion D1 of the second class particles 3*b*. That is, the second particles 3 of this embodiment include long cone-shaped particles and biconical cone-shaped particles.

It could be understood that the second particles 3 including the long cone-shaped first class particles 3*a* and the biconical cone-shaped second class particles 3*b* have a weaker scattering effect than the first particles 2. Mixing the second particles 3 with the first particles 2 and setting them in the hard coating 10 can make the polarizer 100 have a scattering effect while the contrast of the display panel to which the polarizer 100 is attached is less affected, thus the contrast is better.

It should be noted that the second particles 3 of one or more embodiments of the present application may be in any combination. For example, the second particles 3 may include long cone-shaped particles and biconical cone-shaped particles. For another example, the second particles 3 may comprise long cone-shaped particles, biconical cone-shaped particles, and particles in which the first end portion D1 is conical and the remaining portion is columnar. The second particles 3 may also be a combination of biconical cone-shaped particles and particles in which the first end portion D1 is conical and the remaining portion is columnar. Or the second particles 3 may be a combination of long cone-shaped particles and particles in which the first end portion D1 and the second end portion D2 are conical while the intermediate portion is columnar. There is no limitation in the present application.

In one or more embodiments, the ratio of the mass of all the first particles 2, the mass of all the first class particles 3*a* and the mass of all the second class particles 3*b* is (1~10): (40~70):(20~60). Specifically, the ratio of the mass of all the first particles 2, the mass of all the first class particles 3*a* and the mass of all the second class particles 3*b* may be 1:40:59, 2:42:56, 3:45:52, 4:48:48, 5:70:25, 5:69:26, 6:68:26, 7:55: 38, 8:55:37 or 9:52:39.

It could be understood that a mass ratio of the first particles 2, the first class particles 3*a* and the second class particles 3*b* within this range enables the polarizer 100 to have a larger chromatic view angle and a larger contrast when attached to the display panel.

Further, the ratio of the mass of all the first particles 2, the mass of all the first class particles 3*a*, and the mass of all the second class particles 3*b* is (50~55):(1~5):(45~50), which enables the display panel to which the polarizer 100 is affixed to have a chromaticity viewing angle of more than 160 degrees and a contrast of more than 2800. Specifically, the ratio of the mass of all the first particles 2, the mass of all the first class particles 3*a*, and the mass of all the second class particles 3*b* may be 50:5:45, 51:4:45, 52:3:45, 53:2:45, or 54:1:45.

Optionally, the sum of the masses of the first particle 2, the first class particles 3*a* and the second class particles 3*b* is 1% to 30% of the mass of the polarizer 100. Specifically, the sum of the masses of the first particle 2, the first class particles 3*a* and the second class particles 3*b* may be 1%, 2%, 5%, 7%, 8%, 10%, 15%, 20% or 30% of the mass of the polarizer 100. The sum of the masses of the first particle 2, the first class particles 3*a* and the second class particles 3*b* in this range can result in a strong scattering effect and a high light transmission rate of the polarizer 100.

Optionally, the material of the hard coating 10 may be selected from a polyurethane resin, an acrylic resin, an epoxy resin, a vinyl resin, a silicone resin.

Figure 15:
FIG. 15 is a schematic structural diagram of a polarizer according to one or more embodiments of the present application.
Figure 15:
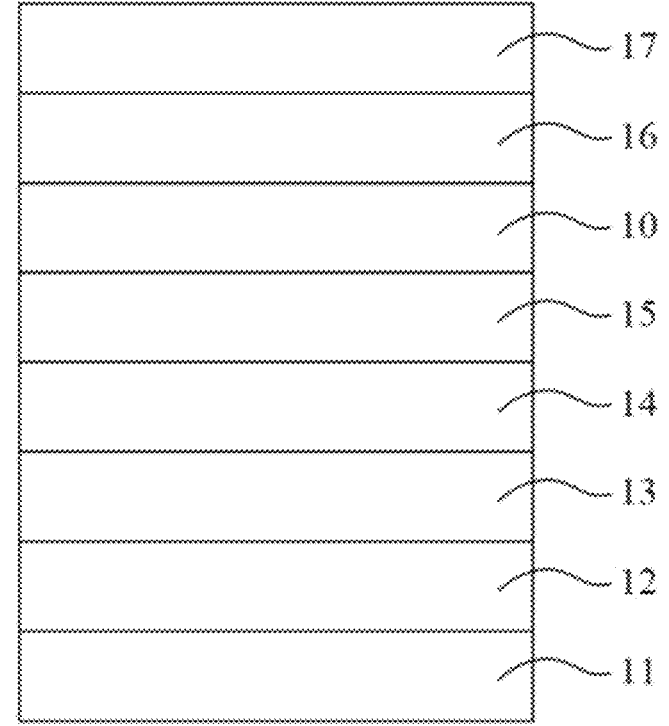

Referring to FIG. 15, the present application also provides a polarizer 100 including a release film 11, a pressure sensitive adhesive layer 12, an optical compensation layer 13, a polarizing film 14, a substrate 15, a hard coating 10, an anti-reflection layer 16, and a protective layer 17, which are stacked in sequence. In a state of use of the polarizer 100, the direction from the release film 11 to the protective layer 17 is a direction of stacking of the film layers in the polarizer 100, and also a direction of incidence of light.

The function of the release film 11 is to protect the pressure sensitive adhesive layer from damage before the polarizer 100 is laminated to the liquid crystal display panel, and to avoid generating lamination bubbles. The release film 11 may be a polyester film such as a polyethylene terephthalate film, a polyolefin film such as a polyethylene film and a polypropylene film, or a polytetrafluoroethylene-type film, or it may be used with a film that has been peel-treated such as a silicone-type resin, a melamine-type resin, or a urea-type resin to make the release film 11 easy to peel.

The pressure sensitive adhesive (PSA) layer 12 is provided on a side of the release film 11. The pressure sensitive adhesive layer 12 is an adhesive layer for bonding the release film 11 to a film layer such as the polarizing film 14 disposed on the release film 11. The material of the pressure sensitive adhesive layer 12 may be, for example, an acrylate resin.

The optical compensation layer 13 is provided on a side of the pressure sensitive adhesive layer 12 back away from the release film 11. The optical compensation layer 13 may be, for example, a compensation layer or a phase difference film or the like in which a liquid crystalline compound is coated on the surface of a substrate and oriented and fixed.

The polarizing film 14 is provided on a side of the optical compensation layer 13 back away from the pressure sensitive adhesive layer 12. The polarizing film 14 may comprise polyvinyl alcohol. Specifically, the polarizing film 14 may comprise a polyvinyl alcohol film colored with iodine or a polyene compound obtained by dehydrating the polyvinyl alcohol film.

The substrate 15 is provided on a side of the polarizing film 14 back away from the optical compensation layer 13. The substrate 15 is used to protect the polarizing film 14 and support film layers disposed above the substrate 15. The substrate 15 may include at least one material selected from the following: a cellulose ester resin comprising triacetyl-cellulose (TAC) and the like, a cyclic polyolefin resin comprising an amorphous cyclic polyolefin (COP) and the like, a polycarbonate resin, a polycarbonate resin comprising polyethylene terephthalate (PET) and the like, a polyether-sulfone resin, a polysulfone resin, a polyamide resin, a polyimide resin, a non-cyclic polyolefin resin, a polyacrylate resin comprising a poly(methyl methacrylate) resin and the like, a polyvinylalcohol resin, a polyvinyl chloride resin, and a polyvinylidene dichloride resin, without limitation. Specifically, the material of the substrate 15 is PET.

The hard coating 10 is provided on a side of the substrate 15 back away from the polarizing film 14. The hard coating 10 possesses high hardness, waterproof and oilproof properties, which can well prevent the surfaces of the lower film layers from being scratched, and is easier to clean. Optionally, the hard coating 10 has a pencil hardness greater than or equal to 2H. The hard coating 10 has a high glass transition temperature, e.g., 70 degrees Celsius to 120 degrees Celsius. The material of the hard coating 10 may be selected from a polyurethane resin, an acrylate resin, an epoxy resin, a vinyl resin, a silicone resin. The polarizing film 14, the substrate 15, and the hard coating 10 are contacted two by two. As described above, the whiskers 101 are distributed in the hard coating 10.

The anti-reflection (AR) layer 16 is disposed on a side of the hard coating 10 back away from the substrate 15. The anti-reflection layer 16 is used for anti-reflection and also prevents scratching. The anti-reflection layer 16 is, for example, a thin film of an electromagnet formed on the surface of the hard coating 10.

The protective layer 17 is used to provide protection to the film layers underneath it. The protective layer 17 may cover the anti-reflection layer 16. The protective layer 17 may be a transparent resin film formed from the following materials or their mixtures, copolymers, etc: a thermoplastic resin such as a chain polyolefin resin (a polypropylene resin, etc.), a cyclic polyolefin resin (a norbornene resin, etc.) and other polyolefin resins; a cellulose ester resin such as a cellulose triacetate, a cellulose diacetate, and the like; a polyester resin such as a polyethylene terephthalate, a polyethylene naphthalene dicarboxylate, and a polybutylene terephthalate; a polycarbonate-based resin; and a (meth)acrylic-based resin.

The hard coating of the present application only requires a substrate to be provided on one side, thereby making it possible to simplify the structure of the polarizer by omitting a layer of substrate and a pressure sensitive adhesive for bonding two substrates, and at the same time improving the brightness and contrast due to the omission of a layer of substrate and a layer of pressure sensitive adhesive.

Furthermore, in addition to the film layers described above, the polarizer 100 may have other film layers such as an antistatic layer, which will not be described herein.

Figure 16:
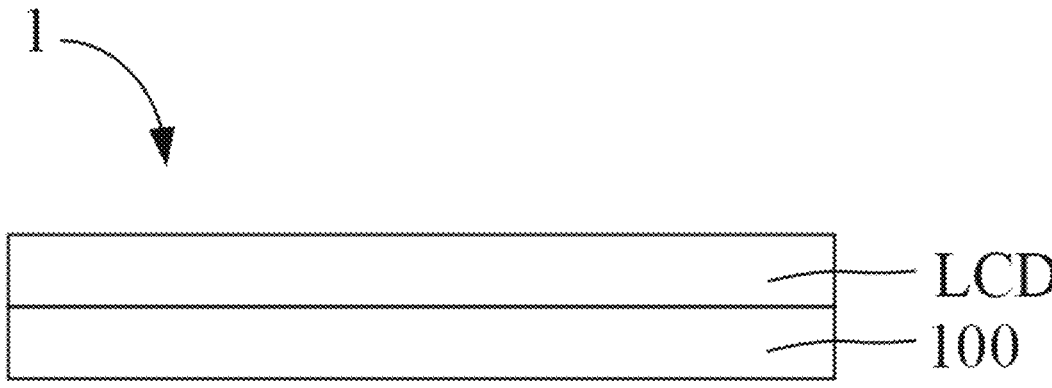
FIG. 16 is a schematic structural diagram of a liquid crystal display device according to one or more embodiments of the present application.

Referring to FIG. 16, the present application also provides a liquid crystal display device 1 comprising a polarizer 100 as described above and a liquid crystal display panel LCD, the polarizer 100 is provided on the light-out side of the liquid crystal display panel LCD. That is, the polarizer 100 of the present application is used as an upper polarizer of the liquid crystal display device 1. The liquid crystal display device 1 also includes structures such as a backlight module and a lower polarizer provided on the light-in side of the liquid crystal display panel LCD, which will not be described herein.

Some embodiments of the present application have been described in detail above. The description of the above embodiments merely aims to help to understand the present application. Many modifications or equivalent substitutions with respect to the embodiments may occur to those of ordinary skill in the art based on the present application. Thus, the content of this specification should not be construed as a limitation of the present invention.

What is claimed is:

1. A polarizer, comprising:
a hard coating comprising whiskers, wherein the whiskers comprise first particles and second particles, the first particles have a same diameter in a lengthwise direction of the first particles, each of the second particles comprises a first end portion and a second end portion in a lengthwise direction thereof, and a diameter of the first end portion decreases along a direction away from the second end portion.

2. The polarizer of claim 1, further comprising:
a polarizing film and a substrate, wherein the substrate is provided between the polarizing film and the hard coating, and the polarizing film, the substrate and the hard coating are in contact two by two.

3. The polarizer of claim 2, wherein the hard coating has a glass transition temperature of 70 degrees Celsius to 120 degrees Celsius.

4. The polarizer of claim 2, wherein the hard coating has a pencil hardness greater than or equal to 2 H.

5. The polarizer of claim 2, wherein an acute angle of greater than 0° and less than or equal to 40° is formed between a long-axis direction of the whiskers and a bottom surface of the hard coating.

6. The polarizer of claim 1, wherein
a diameter of the second particles decreases along a direction of the second end portion toward the first end portion; or
a diameter of the second end portion decreases along a direction away from the first end portion.

7. The polarizer of claim 1, wherein
a diameter of the second particles decreases along a direction of the second end portion toward the first end portion; and
a diameter of the second end portion decreases along a direction away from the first end portion.

8. The polarizer of claim 1, wherein each of the second particles further comprises an intermediate portion, and the first end portion, the intermediate portion, and the second end portion are sequentially connected; and
wherein the intermediate portion has a same diameter in a lengthwise direction of the second particles, and a diameter of the second end portion decreases or the second end portion has a same diameter along a direction away from the first end portion.

9. The polarizer of claim 1, wherein a sum of a mass of the first particles and the second particles is 10% of a mass of the hard coating;
the second particles comprise first class particles and second class particles, each the first class particles and each the second class particles comprising a first end portion and a second end portion in the lengthwise direction thereof;

a diameter of the first class particles decreases along a direction of the second end portion of the first class particles toward the first end portion;

a diameter of the second end portion of the second class particles decreases in a direction away from the first end portion of the second class particles; and a ratio of a mass of all the first particles, a mass of all the first class particles, and a mass of all the second class particles is (1 to 10):(40 to 70):(20 to 60).

10. A liquid crystal display device, comprising a polarizer comprising a hard coating comprising whiskers, wherein the whiskers comprise first particles and second particles, the first particles have a same diameter in a lengthwise direction of the first particles, each of the second particles comprises a first end portion and a second end portion in a lengthwise direction thereof, and a diameter of the first end portion decreases along a direction away from the second end portion.

11. The liquid crystal display device of claim 10, further comprising:

a polarizing film and a substrate, wherein the substrate is provided between the polarizing film and the hard coating, and the polarizing film, the substrate and the hard coating are in contact two by two.

12. The liquid crystal display device of claim 11, wherein the hard coating has a glass transition temperature of 70 degrees Celsius to 120 degrees Celsius.

13. The liquid crystal display device of claim 11, wherein the hard coating has a pencil hardness greater than or equal to 2 H.

14. The liquid crystal display device of claim 11, wherein an acute angle of greater than 0° and less than or equal to 40° is formed between a long-axis direction of the whiskers and a bottom surface of the hard coating.

15. The liquid crystal display device of claim 10, wherein a diameter of the second particles decreases along a direction of the second end portion toward the first end portion; or

a diameter of the second end portion decreases along a direction away from the first end portion.

16. The liquid crystal display device of claim 10, wherein a diameter of the second particles decreases along a direction of the second end portion toward the first end portion; and a diameter of the second end portion decreases along a direction away from the first end portion.

17. The liquid crystal display device of claim 10, wherein each of the second particles further comprises an intermediate portion, and the first end portion, the intermediate portion, and the second end portion are sequentially connected; and wherein the intermediate portion has a same diameter in a lengthwise direction of the second particles, and a diameter of the second end portion decreases or the second end portion has a same diameter along a direction away from the first end portion.

18. The liquid crystal display device of claim 10, wherein a sum of a mass of the first particles and the second particles is 10% of a mass of the hard coating;

the second particles comprise first class particles and second class particles, each the first class particles and each the second class particles comprising a first end portion and a second end portion in the lengthwise direction thereof;

a diameter of the first class particles decreases along a direction of the second end portion of the first class particles toward the first end portion;

a diameter of the second end portion of the second class particles decreases in a direction away from the first end portion of the second class particles; and a ratio of a mass of all the first particles, a mass of all the first class particles, and a mass of all the second class particles is (1 to 10):(40 to 70):(20 to 60).

* * * * *